Dec. 13, 1960  W. M. SHERTS ET AL  2,964,162
LENS BLANK TRANSFER APPARATUS
Filed Aug. 31, 1955  2 Sheets-Sheet 1
FIG. 1
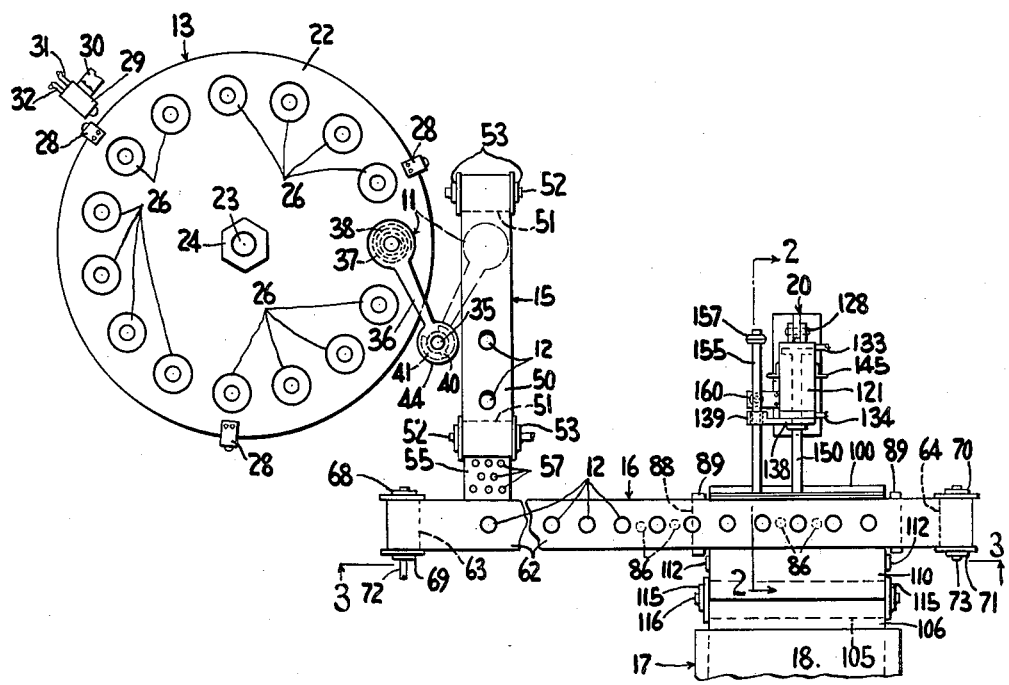
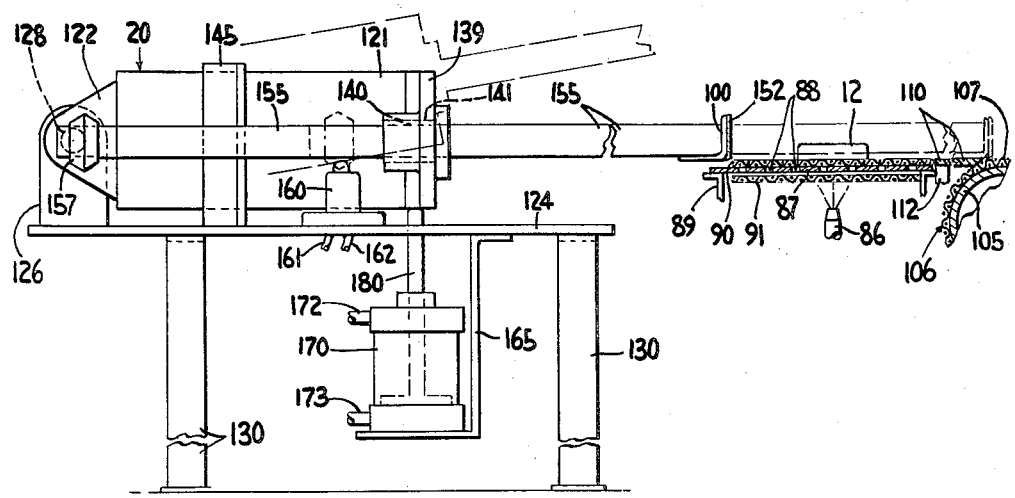
FIG. 2
INVENTOR.
WILLIAM M. SHERTS and
STANLEY A. SCHAFFER
BY
Oscar L. Spencer
ATTORNEY Dec. 13, 1960  W. M. SHERTS ET AL  2,964,162
LENS BLANK TRANSFER APPARATUS
Filed Aug. 31, 1955  2 Sheets-Sheet 2

INVENTORS
WILLIAM M. SHERTS and
STANLEY A. SCHAFFER
BY
Oscar L. Spencer
ATTORNEY United States Patent Office 2,964,162
Patented Dec. 13, 1960

2,964,162

LENS BLANK TRANSFER APPARATUS

William M. Sherts, Kittanning, and Stanley A. Schaffer, Ford City, Pa., assignors to Pittsburgh Plate Glass Company Filed Aug. 31, 1955, Ser. No. 531,634

2 Claims. (Cl. 198—31)

This invention relates to an apparatus for transferring lens blanks from a press mold table to a conveyer of an annealing lehr. Invention relates especially to an apparatus for effectuating said transfer in which the lens blanks are removed from the table one at a time but are placed on the conveyer in rows.

Optical lens blanks are produced by customary or conventional press mold tables that have a series of molds adjacent to the periphery of the table that is rotatable. The press mold apparatus provides a gob of molten glass at one of the numerous stations of operations spaced around and above the rotating press mold table. At the final station, the lens blank is ready for removal. At this station, it is removed one at a time and in the apparatus of the prior art these lens blanks were fed one at a time to a conveyer belt for the annealing lehr to provide a single row of lens blanks therethrough. In the method of the prior art, hot optical lens blanks had been placed manually by means of tongs on the receiving end of the annealing lehr conveyer or were slid down a stationary chute and piled on the lehr conveyer in a random manner, but this resulted in damage to the surfaces of the lens blanks and did not insure a uniform pattern so as to facilitate the removal of the lens blanks coming from the cool end of the annealing lehr on the conveyer.

It is an object of the present invention to provide an apparatus for transferring optical lens blanks from a press mold to an annealing lehr without bumping or bruising the lens blanks.

It is another object of this invention to provide an apparatus for transferring the lens blanks from the press mold table to the annealing lehr whereby the lens blanks are loaded onto the conveyer of the lehr in a uniform pattern of rows thereby facilitating their removal from the cool end of the lehr.

It is a further object of this invention to provide an apparatus for transferring lens blanks from a press mold table to an annealing lehr wherein the lens blanks are removed one at a time from the mold table and yet placed in rows upon the conveyer of the annealing lehr.

Another object of the present invention is to provide an apparatus for transferring lens blanks one at a time from a press mold table and yet onto a conveyer of an annealing lehr a row of lens blanks at a time without fracturing the surface of the lens blanks by contact with a relatively cool apparatus for effectuating said transfer.

Another object of the present invention is to provide an apparatus to transfer lens blanks from a mold table to an annealing lehr by removing the blanks one at a time from the table and placing them a row at a time on the lehr conveyer wherein the number in the row, i.e., the transverse spacing on the lehr conveyer belt, is readily changed by a slight change in speed of operation of part of the apparatus and wherein there is easy adjustability of the transfer time by a mere change of speed of operation of another part of the apparatus.

Other objects will be apparent to one skilled in the art from the description which follows when taken in conjunction with the drawings in which:

Fig. 1 is a top plan view of a preferred embodiment of the apparatus of the present invention and showing also a part of an optical lens blank press mold table and an annealing lehr;

Fig. 2 is an enlarged fragmentary cross section taken on line 2—2 of Fig. 1;

Figure 3:
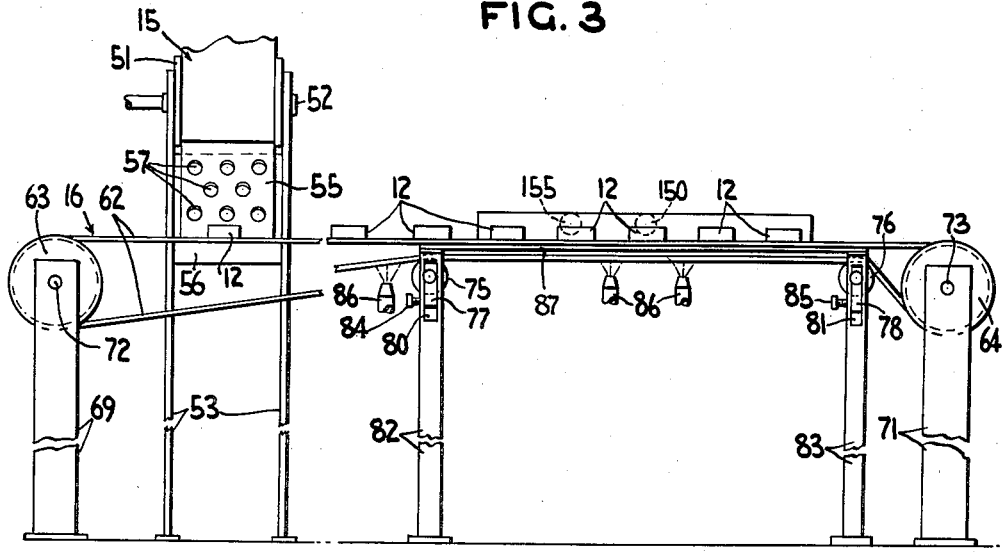
Fig. 3 is an enlarged fragmentary cross section taken along 3—3 of Fig. 1.
Figure 4:
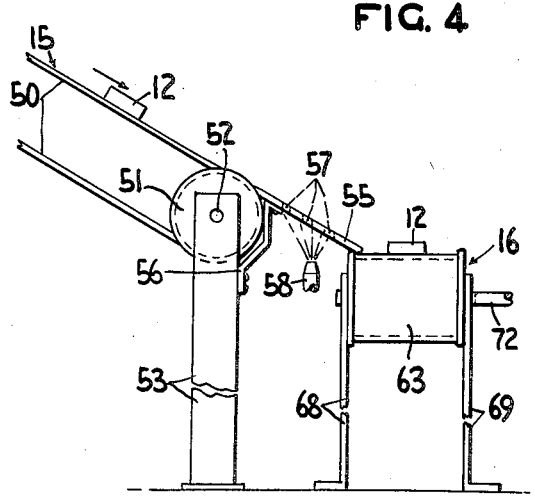
Fig. 4 is an enlarged fragmentary end elevation of the inclined and cross conveyers of the invention.

The apparatus of the present invention includes in the preferred embodiment a vacuum take-off assembly generally indicated at 11 for removing optical lens blanks 12 from a press mold assembly generally indicated at 13. Assembly 11 removes lens blanks 12 one at a time from press mold assembly 13. Vacuum take-off assembly 11 transfers lens blanks 12 to inclinded conveyer generally indicated at 15 that transfers or conveys lens blanks 12 to a cross conveyer generally indicated at 16. Cross conveyer 16 is arranged with its longitudinal axis transverse to the longitudinal axis of an annealing lehr generally indicated at 17 and extends along and beyond a conveyer 18 for annealing lehr 17 at the receiving end of lehr 17. In alignment with conveyer 18 of lehr annealing assembly 17 is a lens blank pusher assembly generally indicated at 20.

As seen in Fig. 1, press mold assembly 13 includes a mold table 22 rotatably mounted on a vertical shaft 23 and held on the shaft by nut 24. A series of molds 26 are spaced around table 22 near the periphery. In molds 26, lens blanks 12 are formed by the conventional press molding technique of the prior art. Spaced around the periphery of table 22 are button-valve-tripping plates 28 bolted on table 22. Plates 28 serve as cam members and engage valve 29 mounted on support 30 and connected to a pilot valve and an air source (both not shown) by tubes 31 and 32.

Vacuum take-off assembly 11 includes a vertical shaft 35 having mounted thereon arm 36. At the free end of arm 36 is mounted a tube 37 connected to a vacuum source (not shown). Coiled or wrapped around tube 37 a number of times is a ribbon of asbestos 38. The coiled asbestos ribbon 38 cooperates with tube 37 to provide one type of suitable vacuum cup for removal of lens blanks 12 from molds 26. Arm 36 is rotated about shaft 35 by means of follower 40 on shaft 35 engaging a helical groove 41 in the inside surface of fixed cylinder 44. Shaft 35 is moved along its axis by means of an air cylinder (not shown). Such movement results in rotation of shaft 35 because of follower 40 and helical groove 41.

Inclined conveyor 15 has an asbestos conveyor belt 50 and a pair of conveyor rollers 51. Rollers 51 are mounted by shafts 52 on supports 53. One of shafts 52 is driven by a motor (not shown). An apron plate 55 is supported by bracket 56 mounted on support 53 at the bottom end of inclined conveyor 15 so that the top surface of apron plate 55 is parallel with the top surface of conveyor belt 50 and is adjacent to belt 50 at the point of engagement of belt 50 with roller 51 at the bottom of inclined conveyor 15. Apron plate 55 is provided with holes 57 through which hot burned gases pass from burner 58 under apron plate 55 for keeping lens blanks 12 at an elevated temperature.

Cross conveyer 16 has a steel chain conveyor belt 62 and rollers 63 and 64 around which passes belt 62. Roller 63 is mounted on supports 68 and 69 and roller 64 is mounted on supports 70 and 71 by means of shafts 72 and 73, respectively. Conveyor 16 is also provided with idle pulleys 75 and 76 mounted in adjusting blocks 77 and 78 in slots 80 and 81 in supports 82 and 83. Blocks 77 and 78 are fixed in slots 80 and 81 by screws 84 and 85. Gas burners 86 are spaced below belt 62 of cross conveyor 16 to prevent a great temperature differential between lens blanks 12 and conveyor belt 62 as well as to keep lens blanks 12 from becoming too cool before being placed in annealing lehr 17. As seen in Fig. 2, a metal plate 87 is provided with holes 88 and is mounted to vertical supports 89. Plate 87 is placed in a horizontal plane below top run 90 of conveyor belt 62 and above bottom run 91 of conveyor belt 62. Heated gases from burners 86 can pass directly up through bottom run 91 and through holes 88 in plate 87 to conveyor belt top run 90 for the purpose indicated above. Plate 87 extends underneath and supports top run 90 of conveyor belt 62 which slides thereover in the section traversed by pusher bar 100 of lens blank pusher assembly 20, thus providing accurate alignment of lens blanks 12 in a horizontal plane including pusher bar 100.

Annealing lehr 17 has its conveyor 18 arranged relative to cross conveyor 16 so that the direction of travel on conveyors 16 and 18 are substantially normal and arranged to be in the same horizontal plane. As seen in Fig. 2, both top run 90 and bottom run 91 are spaced from and separated from conveyor roller 105 of conveyor 18 and having conveyor belt 106 therearound. Spanning the space between the top run 107 of conveyor belt 106 and the top run 90 of cross conveyor belt 62 is a horizontal apron plate 110 supported by vertical rods 112. Roller 105 is mounted on supports 115 by means of shaft 116. It is seen that horizontal apron plate 110 is mounted to have its top surface coplanar with the top surface of top run 90 and the top surface of top run 107 of conveyor belt 106.

Lens blank pusher assembly 20 includes an air cylinder 121 provided with a clevis 122 at one end for mounting on supporting table 124 by means of vertical flange 126. A pin 128 is in aligned holes of clevis 122 and vertical flange 126. Support table 124 is mounted on legs 130. Air cylinder 121 is provided with pipes 133 and 134 that serve alternately as inlet and outlet pipes for air. Front end cap 138 of air cylinder 121 is provided with a side extension 139 that has a hole 140 in which is mounted a bushing 141. Vertical guide plates 145 are on each side of air cylinder 121. Piston rod 150 of air cylinder 121 has mounted at its free end a push bar 100 on which is mounted at its front face an asbestos facing 152. A guide bar 155 is mounted in bushing 141 and connected at one end to push bar 100. A collar 157 is mounted on guide bar 155 and serves as a cam to engage an air button valve 160 mounted on support table 124 and connected by tubes 161 and 162 to the air source and to the pilot valve, which is also connected to button valve 29, as described above, to control the flow of air into and out of air cylinder 121. Mounted to the underside of table 124 is a supporting member 165 to which is mounted an air cylinder 170 having pipes 171 and 172 for alternately serving as inlet and outlet pipes to air cylinder 170. Piston rod 180 at its free end abuts the underside of the free end of cylinder 121.

Operation

Lens blanks 12 are removed one at a time from mold table 22 by means of take-off assembly 11 which is controlled in its movements by vertical movement of shaft 35 with rotation provided by follower 40 and groove 41. The air cylinder that reciprocates shaft 35 is synchronized by a cam and an air button valve (both not shown) in which the cam is rotated with rotation of mold table 22. In addition, vacuum to tube 37 for lifting lens blank 12 up against asbestos ribbon 38 is controlled by a similar cam means (not shown) associated with the rotation of table 22.

Take-off assembly 11 moves lens mold 26 to a top portion of inclined conveyor 15. Then vacuum in line 37 is released. Arm 36 returns to mold table 22 to pick up another lens blank 12. The lens blank 12 deposited on conveyor 15 moves with conveyor belt 50 and onto apron 55 from whence it slides onto cross conveyor belt 62. It is carried by continuous operating cross conveyor 16 to the section in alignment with pusher bar 100 and conveyor 18 of annealing lehr 17.

Plates 28 are arranged around mold table 22 so that in the embodiment shown five lens blanks 12 are in alignment with push bar 100 and on cross conveyor belt 62 at the moment that a plate 28 trips valve 29. Air button valve 29 when tripped operates to open the pilot valve to provide air under pressure into pipe 133 and out of pipe 134 to cause piston rod 150 to move forward and to lower piston rod 180 by introducing air in pipe 172 and out pipe 173. Piston rod 150 moves with it push bar 100 and guide bar 155. The five lens blanks 12 that are at this point in alignment with pusher bar 100 are contacted by asbestos facing 152 of pusher bar 100 and slid across the top run 90 of belt 62 onto and across apron plate 110 and then onto top run 107 of conveyor belt 106. This provides a row of five lens blanks 12 onto annealing lehr conveyor 18 by actuation of air cylinder 121.

When guide bar 155 is moved by piston rod 150 and pusher bar 100 to the maximum movement as described above, collar 157 engages air button valve 160 to actuate the pilot valve (not shown) for providing air into tube 173 and air out of tube 172 to cause piston rod 180 of air cylinder 170 to push up against air cylinder 121 thereby raising it at the free end and also to provide air into pipe 134 and out of pipe 133 to retract horizontal cylinder piston rod 150. The retraction and raising are simultaneous. Retracting slowly and raising fast allows the push bar to clear any lens blanks 12 on the conveyer as it is retracted. Pusher cylinder 121 remains up until cam 28 hits valve 29 starting the whole cycle over. It is seen from this operation that the pusher bar 100 pushes lens blanks 12 as a group in a row from conveyer belt 62, across plate 110 and onto conveyer belt 106 as a row of lens blanks 12. Pusher bar 100, because it is raised before it passes over conveyer belt 62 on its return trip, does not interfere with additional lens blanks 12 being conveyed along into position for being pushed in the next sequence of operations of lens blank pusher assembly.

The speed of drive of belts 50 and 62 can be varied independently to give some of the advantages in the objects stated above, viz., spacing in a row and degree of cooling of lens blanks.

Various modifications of the apparatus of the present invention will be apparent to one skilled in the art. For example, instead of cams 28 and valve 29 to start the push cycle, a swinging trigger can be mounted above cross conveyer 16 to engage the first of a group of lens blanks 12 to be pushed as a unit onto conveyer belt 18 and thereby actuate a microswitch. The microswitch actuates a solenoid valve to provide air to the pilot valve to start the pushing cycle. The foregoing description of the preferred embodiment is presented merely for purposes of illustration and not by way of limitation. Accordingly, the invention is limited only by the claims which follow.

We claim:
1. An apparatus for the transfer of lens blanks from a lens blank forming station to a conveyer of an annealing lehr which comprises a first air cylinder pivotally mounted adjacent one end and having a piston rod extending at the other end, a pusher bar connected to said piston rod, cam means mounted to move with said pusher bar, a second air cylinder having a piston rod mounted to pivot the first air cylinder from a substantially horizontal position to an inclined position and to support said first air cylinder in the inclined position, transfer means including a rotary table for moving lens blanks from the forming station to a take-off station and a conveyor including a conveyor belt and means for moving the blanks one at a time from the take-off station to a section of the top run of the conveyor belt, valve means for simultaneously actuating said first and second air cylinders, a first valve actuating means operatively associated with said transfer means for actuating said valve means to move the pusher bar across another section of the top run of the conveyor belt and to move the rod of the second air cylinder from said supporting position, and a second valve actuating means operatively associated with said cam means for actuating said valve means to return the pusher bar across the belt and to move the rod of the second air cylinder to said supporting position.

2. An apparatus for the transfer of lens blanks from a lens blank forming station to a conveyor of an annealing lehr which comprises a first air cylinder pivotally mounted adjacent one end and having a piston rod extending at the other end, a pusher bar connected to said piston rod, cam means mounted to move with said pusher bar, a second air cylinder having a piston rod mounted to pivot the first air cylinder from a substantially horizontal position to an inclined position and to support said first air cylinder in the inclined position, transfer means including a rotary table for moving lens blanks from the forming station to a take-off station and a conveyor including a conveyor belt and means for moving the blanks one at a time from the take-off station to a section of the top run of the conveyor belt, valve means for simultaneously actuating said first and second air cylinders, a first button valve operatively associated with said transfer means for actuating said valve means to move the pusher bar across another section of top run of the conveyor belt and to move the rod of said second air cylinder from said supporting position, and a second button valve operatively associated with said cam means for actuating said valve means to return the pusher bar across the belt and to move the rod of the second air cylinder to said supporting position.

References Cited in the file of this patent
UNITED STATES PATENTS

| | | |
|---|---|---|
| 1,832,343 | Wittman | Nov. 17, 1931 |
| 1,853,417 | Hall | Apr. 12, 1932 |
| 1,947,609 | McNamara | Feb. 20, 1934 |
| 2,077,830 | Failinger | Apr. 20, 1937 |
| 2,094,497 | Ross | Sept. 28, 1937 |
| 2,556,082 | Hartness | June 5, 1951 |
| 2,730,068 | Reynolds et al. | Jan. 10, 1956 |
| 2,734,617 | Temple | Feb. 14, 1956 |